Patented Apr. 8, 1947

2,418,624

UNITED STATES PATENT OFFICE 2,418,624

AZO DYES FOR COLOR PHOTOGRAPHY

Jonas John Chechak, and Burt H. Carroll, Rochester, N. Y., assignors to Eastman Kodak Company, Rochester, N. Y., a corporation of New Jersey No Drawing. Application March 2, 1943, Serial No. 477,758

6 Claims. (Cl. 95—6)

This invention relates to color photography, and more particularly to azo dyes for incorporation in photographic layers.

Processes of color photography depending upon the chemical bleaching of dyes in the presence of developed silver images are well known. A process of this type in which azo dyes are employed in multilayer coatings to produce colored images is disclosed in Christensen U. S. Patent 1,517,049, granted November 5, 1924. In this process, azo dyes are uniformly dispersed in gelatino-silver halide layers, and these layers are coated on a support. The film is exposed, developed and fixed and is then subjected to the action of a bleaching bath which destroys the dyes in the presence of the silver images but leaves the dye unaffected where there is no silver image. This results in the production of a natural-color positive image directly.

It has been found that many of the dyes heretofore employed in processes of this type are objectionable for various reasons. Among these is the tendency of many of the azo dyes to wander from one layer to another and thereby to produce an unsatisfactory color picture. Where such wandering occurs, it sometimes could be prevented by precipitating the dyes with organic bases although this means has the disadvantage of increasing the cost of preparing the dyed emulsions and frequently making the incorporation of a sufficient concentration of the dye difficult owing to a tendency for the precipitated dye to separate out. Furthermore, many dyes previously suggested tend to migrate from one layer to another, while others are sufficiently nondiffusing, but have the disadvantage of being difficult to incorporate because of limited solubility characteristics, or, if capable of ready incorporation, cannot be satisfactorily bleached or removed from the layers during the processing operations. Then, too, there is always the problem of obtaining dyes, which, in addition to having desirable characteristics of good solubility, non-diffusibility, ease of bleaching, and the like, must also have satisfactory color ranges and have little adverse effect on sensitized emulsions.

It is, therefore, an object of the present invention to provide dyes which do not diffuse through set gelatin, or which diffuse only very slightly. A further object is to provide dyes for color photography which can be bleached readily in the presence of a silver image and which do not desensitize emulsions in which they are incorporated, and have none of the disadvantages of the dyes previously described. A further object is to provide a photographic element having at least one layer containing a dye contemplated by our invention. Another object is to provide image-forming dyes for color photography which have the proper spectral absorption ranges. Other objects will appear from the following description of our invention.

The dyes of our invention are azo dyes having a urea base. Azo dyes having a urea base, of course, have been used in color photography for substantially the same purpose as our dyes are intended; however, we do not believe that our particular dyes have been used before our invention, nor do the dyes of the prior art, having similar chemical formulae, have the advantages of our dyes. Particularly, we do not lay claim to any method of forming our dyes in an emulsion layer, as for instance by diazotization and coupling within an emulsion layer, since we incorporate the pre-formed dye in the emulsion layer which has, among other advantages, that of being a much purer dye, since it can be coupled under favorable conditions followed by purification before adding it to the emulsion.

The dyes of our invention have the general structural formula:

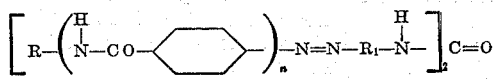

in which $n$ is 1, 2 or 3 and R is a benzene or naphthalene nucleus, or pyridine, any of which may or may not carry substituents, such as alkyl, alkoxy, hydroxy, sulfo carboxy, carboxylic ester, halogen, sulfonamide, acylamino, aracylamino, aryloxy, or alkyl acylamino. $R_1$ is a benzene or naphthalene nucleus. If a benzene nucleus, $R_1$ may or may not carry substituents such as alkyl, alkoxy, halogen, hydroxy, aryloxy, sulfonamide, acylamino, aracylamino, and if a naphthalene nucleus, may in addition have sulfo, carboxy, or carboxylic ester substituents.

The dyes of our invention are made by known means, which will be readily manifest from the following examples:

Example 1

The dye:

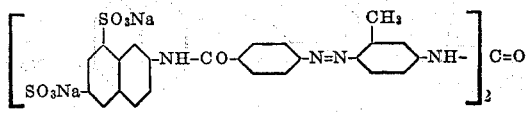

is obtained by reacting the monoazo dye from 2-(4'-aminobenzoyl-amino)-naphthalene-6,8-disulfonic acid and m-toluidine with carbonyl chloride by known means and then isolating the dye in the form of a convenient salt, such as sodium, potassium or ammonium. Then, after suitable purification to remove by-products, the dye is ready for use in color photography. The dye is a satisfactory yellow dye which has adequate water solubility to facilitate incorporation in photographic emulsion layers and also causes little or no desensitization of the emulsion. In addition, the dye is quite stable to light and functions satisfactorily in a photographic process of the type described in which the dye is bleached out under influence of a silver image. The dye is resistant to diffusion through gelatin such as is used in gelatino-silver halide emulsions.

*Example 2*

The dye:

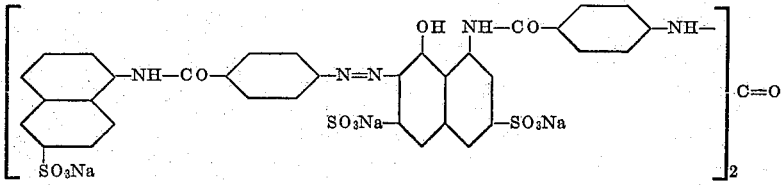

is obtained by reacting the monoazo dye from 2 - ((4'(4''- aminobenzamido) - benzoylamino))- naphthalene-6,8-disulfonic acid and cresidine with carbonyl chloride. The resulting dye has properties similar to that of Example 1.

*Example 3*

The dye:

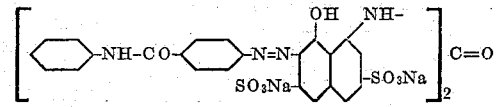

is obtained by diazotizing 1-(4'-aminobenzoyl-amino)-naphthalene-6-sulfonic acid and coupling in alkaline medium with N-(4'-aminobenzoyl)H-acid and reacting the product with carbonyl chloride. The resulting dye is magenta in color and has the same desirable properties as the dye of Example 1.

*Example 4*

The dye:

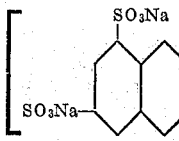 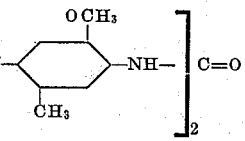

is obtained by diazotizing 4'-amino-benzoylaniline and coupling in alkaline medium with H-acid and reacting the product with carbonyl chloride. The resulting dye is a magenta and has properties similar to that of Example 1.

*Example 5*

The dye:

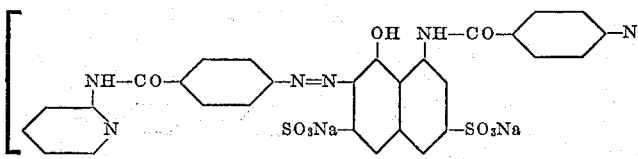

is obtained by diazotizing 2-(4'-aminobenzoyl-amino)-pyridine, coupling in alkaline medium with N-(4'-aminobenzoyl)H-acid and reacting the product with carbonyl chloride. The dye is a magenta and is suitable for use in the described photographic color processes.

In addition to their use in emulsion layers processed as described, our dyes are equally suitable for use in light screening layers. The dyes above described can be employed in filter overcoats or interlayers in photographic films, plates or paper, or they may be mixed with unsensitized or optically sensitized emulsions and employed in the preparation of films for color processes, in which the image is formed by a destruction of a portion of a uniform dye concentration in the vicinity of a silver image by treatment with a solution of sodium stannite as described in the Ehrenfried U. S. patent application Serial No. 360,622, filed October 10, 1940, now U. S. Patent 2,322,001, or by the rehalogenization technique disclosed in the copending Ehrenfried U. S. patent application Serial No. 450,386, filed July 10, 1942, now U. S. Patent 2,350,736.

When used as image-forming dyes in light-sensitive photographic layers, the dyes which we have described may be used in a photographic material such as that described in Christensen U. S. Patent No. 1,517,049, granted November 5, 1934. In the material described in the Christensen patent the sensitive layers are uniformly colored a color complementary to that which they are designed to record. The blue-sensitive layer is colored yellow, the green-sensitive layer is colored magenta, and the red-sensitive layer is colored blue-green. However, the dyes used according to our invention may also be incorporated in layers which are sensitized to any color. For example, the dyes proposed according to our invention may be incorporated in any or all desired layers of a multi-layer coating.

The sensitive compositions containing our dyes may be coated on transparent film supports such as a derivative of cellulose including cellulose nitrate, cellulose acetate, cellulose propionate, cellulose butyrate, cellulose acetate-propionate, cellulose acetate-butyrate, cellulose ether, and the like, as well as on synthetic resins supports such as polyvinyl acetal, and opaque supports such as paper or cellulose derivatives mixed with opaque white pigments. They may be used in single layer or multi-layer coatings or in multi-layer coatings on one or both sides of a support.

Dyes of the general structure which we have described are practically non-diffusing in gelatin and have little adverse effect upon the sensitivity of the emulsion in which they are incorporated or on adjacent emulsion layers. They can be bleached in the presence of the silver or silver salt image with suitable bleaching solutions, such as sodium stannite, the silver salt image being converted to a silver image in the operation, and when using in filter layers, they can be discharged by reduction.

Other variations of our invention are possible and it is to be understood our invention is to be considered as limited only by the scope of the appended claims.

What we claim is:

1. A light-sensitive photographic element comprising a support having thereon a water-permeable colloid layer containing a pre-formed dye having the general formula:

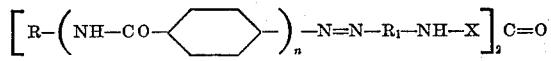

in which R is selected from the group consisting of benzene and naphthalene nuclei and pyridine, X is selected from the group consisting of a chemical bond attached to the carbon atom of the carbonyl group outside the brackets and

$R_1$ is an aryl nucleus, $n$ is a positive integer from 1 to 3, and R and $R_1$ together contain at least two solubilizing sulfonic acid groups.

2. A gelatino-silver halide layer for the silver-dye bleach process of color photography, uniformly dyed with a pre-formed dye having the general formula

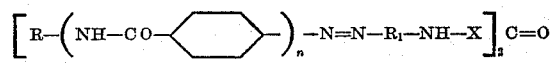

in which R is selected from the group consisting of benzene and naphthalene nuclei and pyridine, X is selected from the group consisting of a chemical bond attached to the carbon atom of the carbonyl group outside the brackets and

$R_1$ is an aryl nucleus, $n$ is a positive integer from 1 to 3, and R and $R_1$ together contain at least two solubilizing sulfonic acid groups.

3. A gelatino-silver halide layer for the silver-dye bleach process of color photography, uniformly dyed with a preformed dye having the general formula:

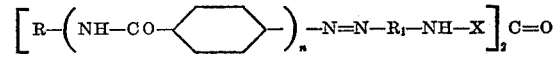

in which R is a naphthalene nucleus, X is selected from the group consisting of a chemical bond attached to the carbon atom of the carbonyl group outside the brackets and

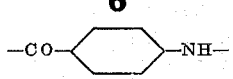

$R_1$ is an aryl nucleus, $n$ is a positive integer from 1 to 3, and R and $R_1$ together contain at least two solubilizing sulfonic acid groups.

4. A gelatino-silver halide layer for the silver-dye bleach process of color photography, uniformly dyed with a pre-formed dye having the general formula:

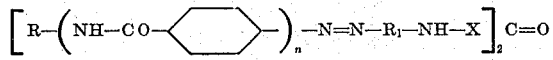

in which R is a naphthalene nucleus, X is selected from the group consisting of a chemical bond attached to the carbon atom of the carbonyl group outside the brackets and

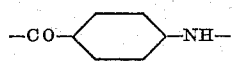

$R_1$ is a naphthalene nucleus, $n$ is a positive integer from 1 to 3, and R and $R_1$ together contain at least two solubilizing sulfonic acid groups.

5. A gelatino-silver halide layer for the silver-dye bleach process of color photography, uniformly dyed with a pre-formed dye having the general formula:

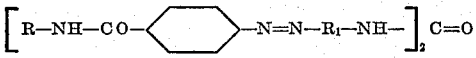

in which R is a naphthalene nucleus, $R_1$ is a benzene nucleus, and R and $R_1$ together contain at least two solubilizing sulfonic acid groups.

6. A gelatino-silver halide layer for the silver-dye bleach process of color photography, uniformly dyed with a pre-formed dye having the general formula:

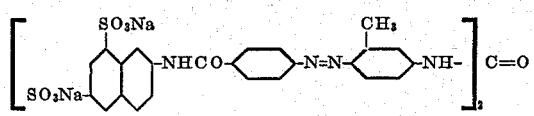

JONAS JOHN CHECHAK.
BURT H. CARROLL.

REFERENCES CITED

The following references are of record in the file of this patent:

UNITED STATES PATENTS

| Number | Name | Date |
| --- | --- | --- |
| 2,179,228 | Eggert et al. | Nov. 7, 1939 |
| 2,304,884 | Carroll | Dec. 15, 1942 |
| 2,167,780 | Rossander | Aug. 1, 1939 |
| 2,326,055 | Morris | Aug. 3, 1943 |
| 2,270,118 | Gaspar | Jan. 13, 1942 |

FOREIGN PATENTS

| Number | Country | Date |
| --- | --- | --- |
| 551,501 | British | Feb. 25, 1943 |